Feb. 1, 1955

J. A. BYINGTON 2,701,064

BOX HANDLING APPARATUS

Filed March 24, 1950

INVENTOR.
JAMES A. BYINGTON
BY
Austin, Wilhelm & Carlson
ATTORNEYS.

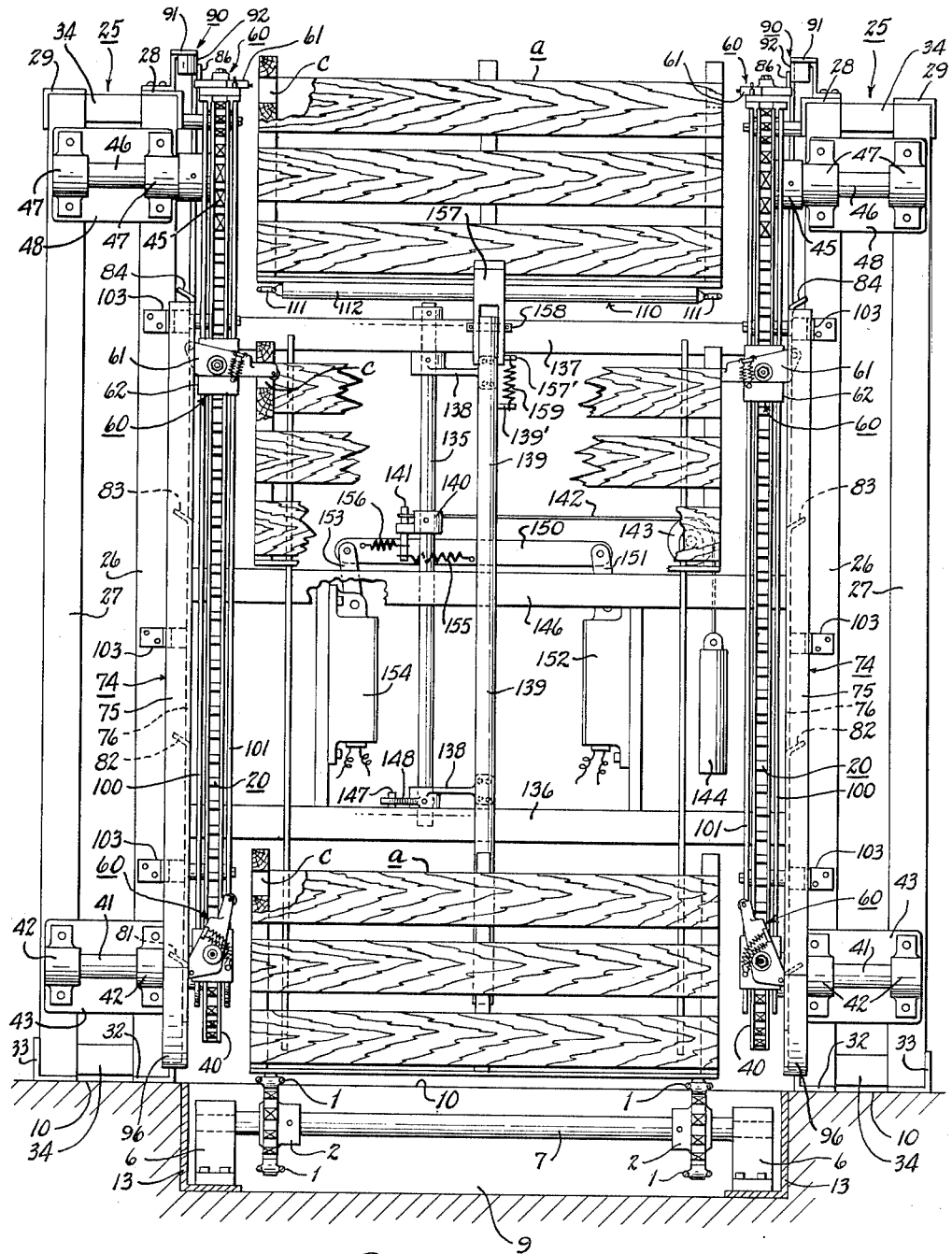

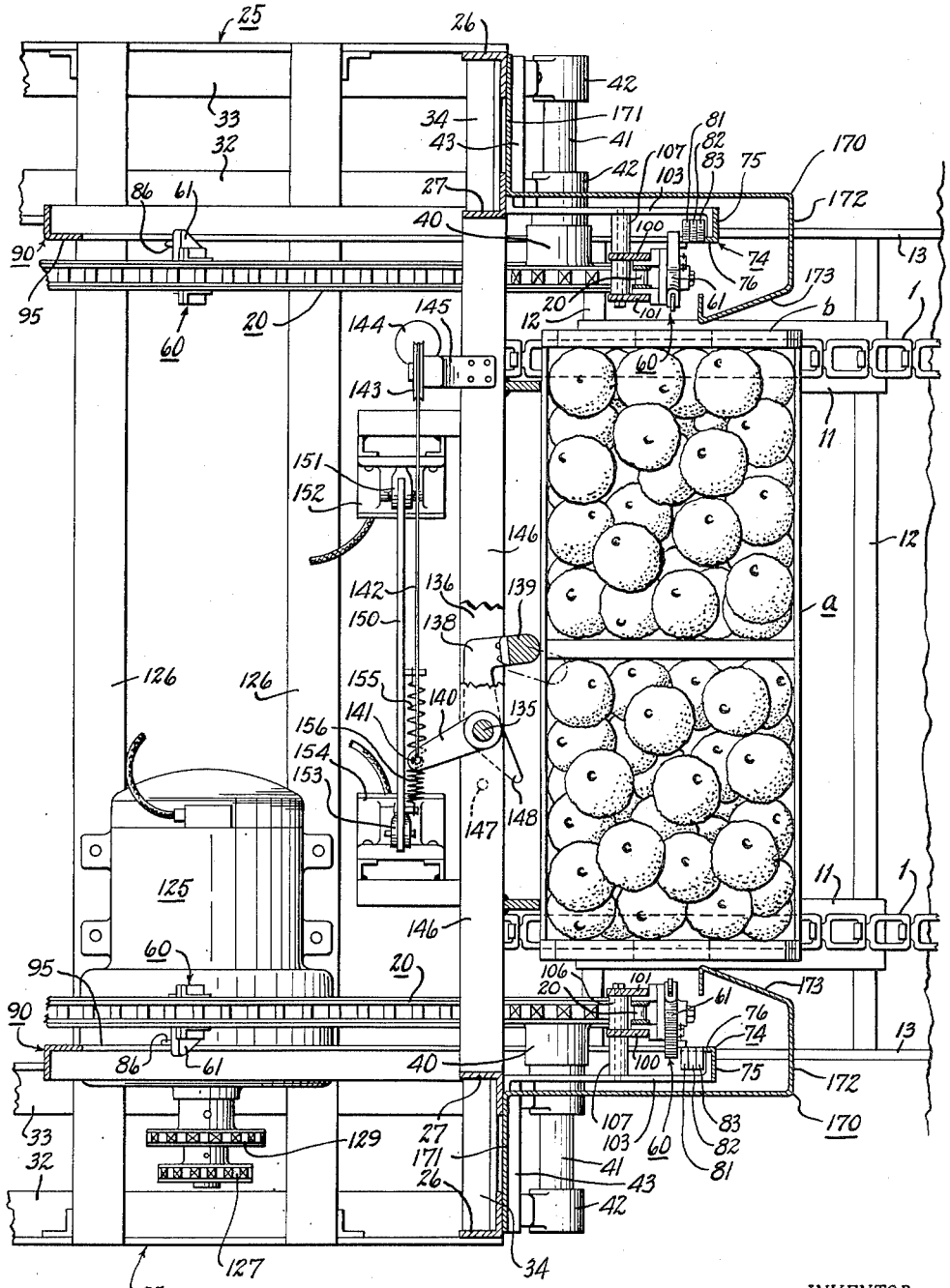

Feb. 1, 1955 J. A. BYINGTON 2,701,064
BOX HANDLING APPARATUS
Filed March 24, 1950 5 Sheets-Sheet 4

INVENTOR.
JAMES A. BYINGTON
BY
Austin, Wilhelm & Carlson
ATTORNEYS.

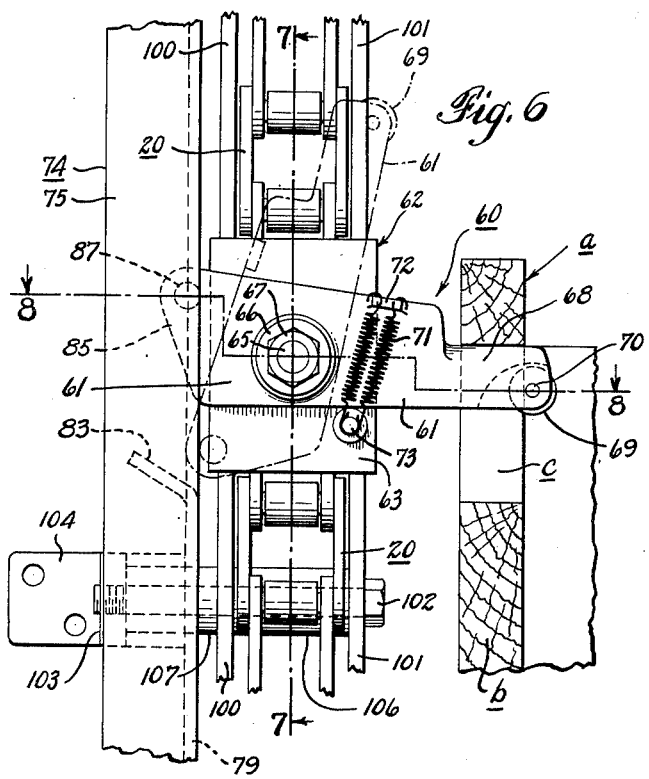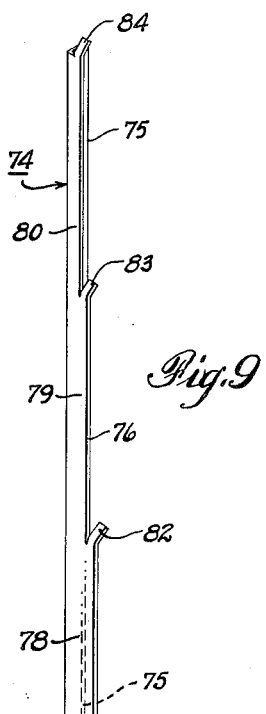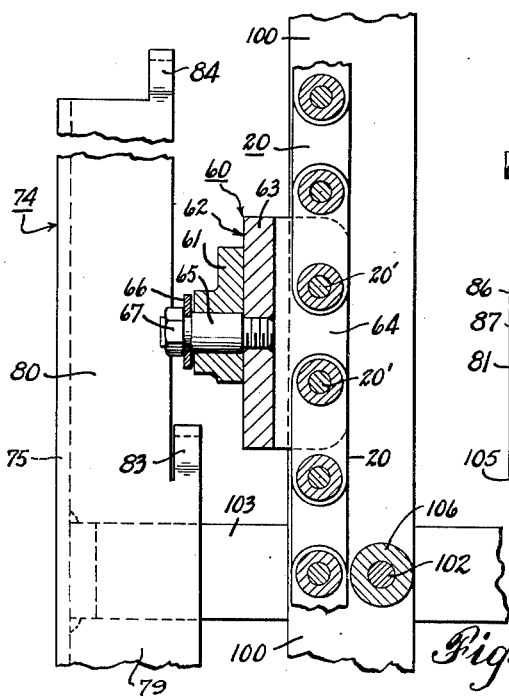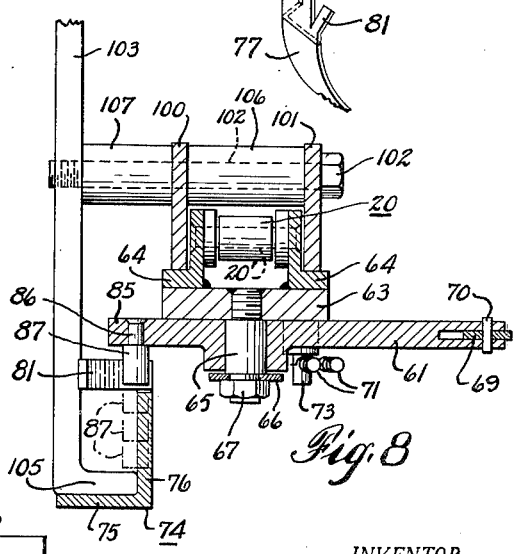

United States Patent Office 2,701,064
Patented Feb. 1, 1955

2,701,064

BOX HANDLING APPARATUS

James A. Byington, Orlando, Fla., assignor to Fruit Treating Corporation, Orlando, Fla., a corporation of Florida Application March 24, 1950, Serial No. 151,704

2 Claims. (Cl. 214—8.5)

This invention relates to an improved box handling apparatus, and more particularly to an improved apparatus designed to receive vertically stacked boxes and to destack and transfer single boxes in spaced relation onto a travelling conveyor.

In the collection and processing of fruit, vegetables and the like, the product is gathered by pickers and placed in collection boxes or field boxes. The filled boxes are collected by truck or vehicle and transported to the processing plant for cleaning, packing and processing. During the picking season, it is desirable to run the processing plant at maximum capacity, and it is desirable to provide box handling apparatus at the plant unloading platform which will furnish rapid transfer of the stacked boxes onto the travelling conveyor which carries the product into and through the plant for treatment and processing.

An object of this invention is to provide an improved apparatus designed to receive vertically stacked boxes, to single the boxes from stacked relation, and to transfer the single boxes onto a travelling conveyor in spaced relation to be thus transported into the plant to the processing point.

Another object of this invention is to provide an improved apparatus for automatically destacking boxes and transferring the boxes in single spaced relation onto a travelling conveyor.

Various other features and advantages of the invention will become apparent as the disclosure proceeds.

Although the novel features which are believed to be characteristic of the invention are particularly pointed out in the claims appended hereto, the invention itself, its objects and advantages and the manner in which it may be carried out, may be better understood by referring to the following description taken in connection with the accompanying drawings forming a part hereof, in which Fig. 1 is a side elevational view partly in section of the improved box destacking apparatus showing the main parts thereof.

Fig. 2 is a front elevational view of the apparatus showing a series of collection boxes in process of destacking as the same would appear when viewed in the direction of the arrows 2—2 of Fig. 1.

Fig. 3 is a fragmentary horizontal cross-sectional view of the apparatus as the same would appear when viewed along the staggered line 3—3 of Fig. 1.

Fig. 6 is a detailed front elevational view of one of the box lifting dogs and dog manipulating cam bar associated with the box lifting chain.

Fig. 7 is a vertical transverse cross-sectional detail of the box lifting dog and manipulating cam bar as viewed in the direction of the arrows 7—7 of Fig. 6.

Fig. 8 is a transverse cross-sectional detail of the box lifting dog and dog manipulating cam bar as the same would appear when viewed along staggered line 8—8 of Fig. 7.

Fig. 9 is a perspective view of the dog manipulating cam bar; and

The improved box destacking apparatus comprises a floor conveyor A designed to extend along the plant receiving platform and thus may be any desired length to conveniently receive any desired number of box stacks B placed thereon as the truck loaded with collection boxes is unloaded.

Figures 1, 10:
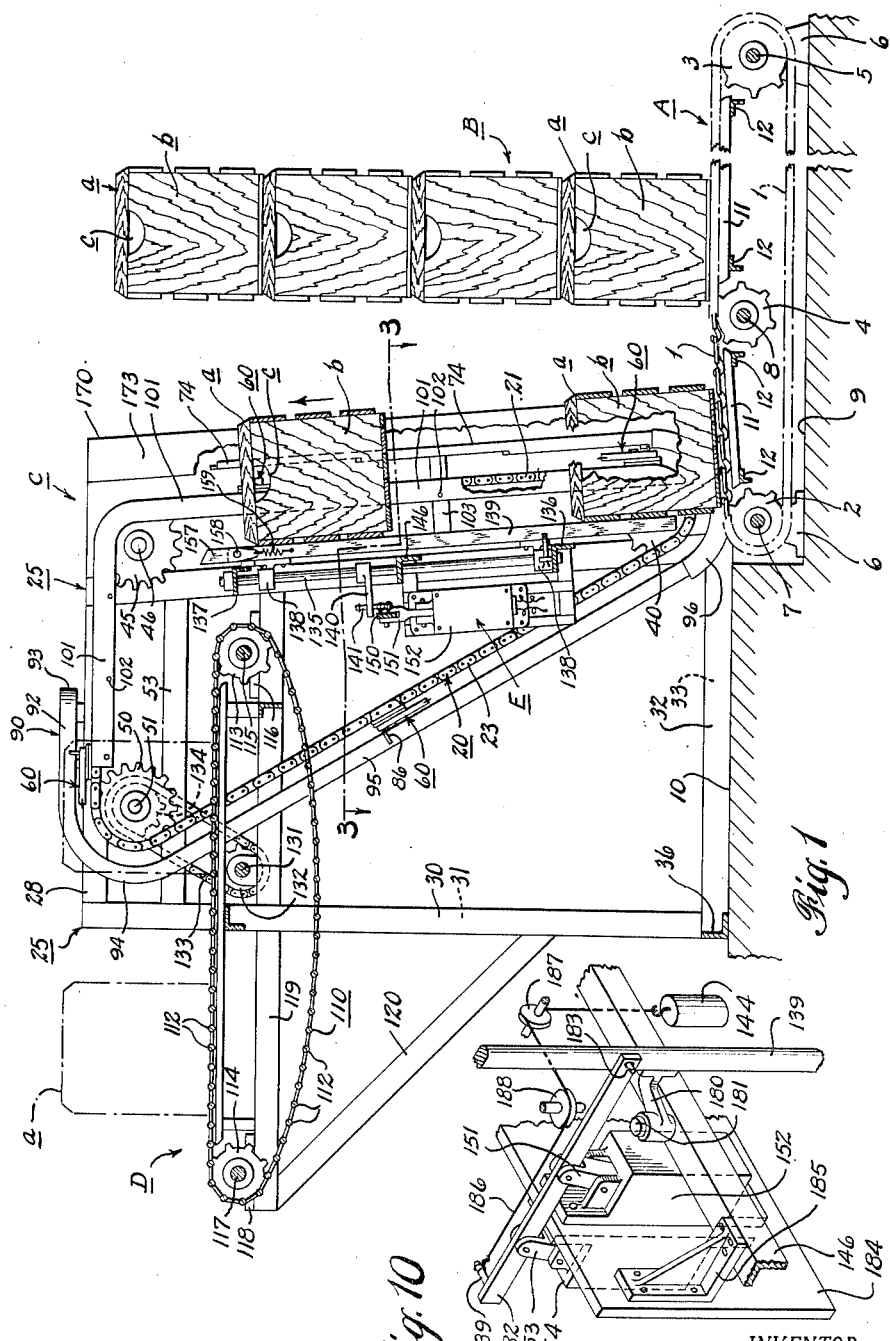
Fig. 10 is a perspective view of an alternative form of electrical switching system for controlling the operation of the several box transporting conveyors.

The floor conveyor A terminates at the foot of a hoisting apparatus C. As shown in Fig. 1, the floor conveyor A will move a box stack B to the hoisting apparatus C which picks up one box at a time and delivers each box to a discharging conveyor D. The floor conveyor A is driven by a power unit G and the vertical hoisting apparatus C is driven by a separate power unit F. A switch system E controls the operation of the power units F and G in a manner so that the floor conveyor A and the hoisting apparatus C are alternately operated, with the discharging conveyor D operating simultaneously with the hoisting apparatus C.

Referring more particularly to Figs. 1 and 2, the floor conveyor A comprises a pair of endless spaced box chains 1. Each box chain 1 is turned around a sprocket 2 at the discharge end of the floor conveyor A and a sprocket 3 at the receiving end thereof, a multiplicity of spaced guide sprockets 4 being provided to take up slack in the chain. Thus it will be appreciated that the paired box chains 1 trained around the paired sprockets 2 and 3 are kept in traveling alignment by the spaced guide sprockets 4 to form an endless box supporting conveyor, with the stacked boxes supported on the upper runs of the paired chains. The paired sprockets 3 are fixed to a shaft 5 whose ends are journalled in bearing blocks 6 suitably bolted to the floor. Likewise, the paired sprockets 2 are fixed to a suitable shaft 7 whose ends are journalled in bearing blocks 6 bolted to the floor. Similarly, each pair of guide sprockets 4 are fixed to a shaft 8 journalled in suitable bearing blocks. As indicated in Fig. 2, the floor may have a channel 9 to receive the floor conveyor A so that the upper run of the chains 1 are maintained at an elevation only slightly above the main floor surface 10.

To further support the paired conveyor chains 1 and to prevent undesired sagging thereof, a supporting plate 11 may be positioned between the successive chain sprockets as shown in Fig. 1. Each support plate 11 is fixedly mounted as by means of suitable brackets 12 which may be secured to the metal guide frames 13 which define the vertical side faces of the floor channel 9 within which the floor conveyor A is contained. The upper runs of the conveyor chains 1 travel in a substantially horizontal plane so that the stacked boxes travel in truly vertical stacks, except at the discharge end of the conveyor A where the upper run of the chains 1 are slightly inclined to tilt the box stack as indicated in Fig. 1 for a purpose which will presently appear.

As shown in Fig. 1, the hoisting apparatus C is positioned adjacent to the discharge end of the floor conveyor A and operates in alternating synchronism therewith. The hoisting apparatus C comprises a pair of endless hoisting chains 20 arranged in parallel relationship and supported to travel around a triangular course to present an inclined front leg 21, an upper horizontal leg 22 and an inclined back leg 23. The paired hoisting chains 20 are spaced apart a sufficient distance to receive the collection boxes or crates *a* therebetween, with the box ends *b* positioned adjacent to the chains 20. Each hoisting chain is supported by a suitable framework 25 as shown more particularly in Figs. 1 and 2.

Figure 4:
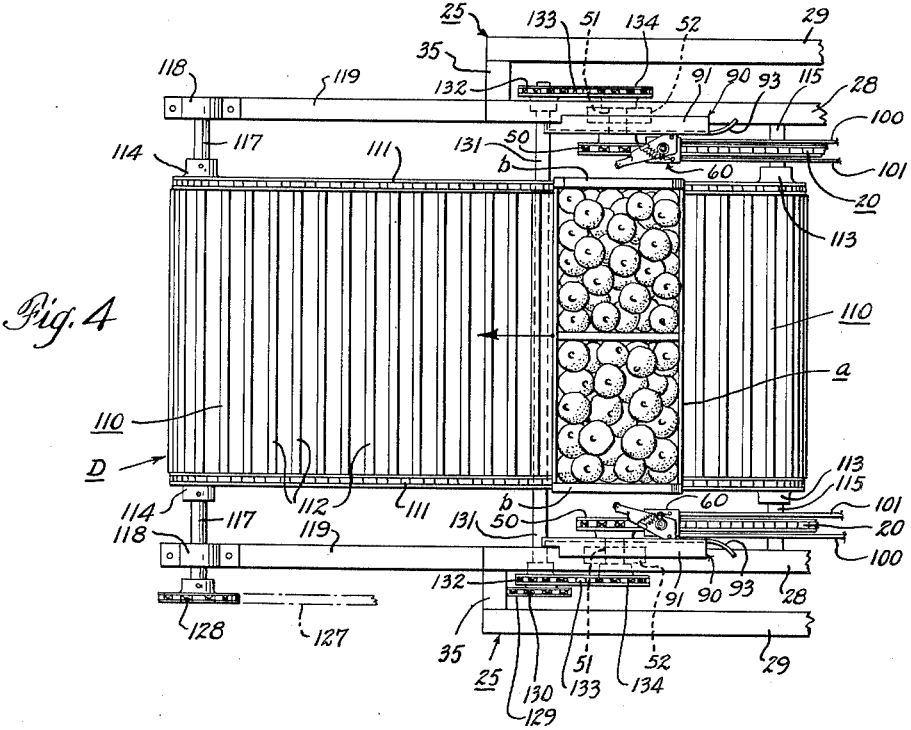
Fig. 4 is a fragmentary top plan view of the apparatus showing the discharging conveyor.

Each framework 25 comprises a pair of upwardly inclined frame members 26 and 27 which extend outside of but substantially in parallel alignment with the front inclined leg 21 of the adjacent hoisting chain 20, as shown in Figs. 1 and 2. A pair of parallel extending top frame members 28 and 29 extend horizontally along the upper horizontal leg 22 of the hoisting chain 20 as shown in Figs. 1, 2, and 4, one end of the top frame members 28 and 29 being secured to the upper ends of the inclined frame members 26 and 27 respectively. The other end of the top frame members 28 and 29 are secured to the upper ends of a pair of vertical frame members 30 and 31, and a pair of lower horizontal frame members 32 and 33 have the ends thereof secured respectively to the lower ends of the vertical frame members 30 and 31 and the vertically inclined frame members 26 and 27. Horizontal strut plates 34 as shown in Fig. 2, may be employed to secure the ends of the vertically inclined frame members 26 and 27 together, as shown in Fig. 2, and horizontal strut plates 35 may be used to secure the paired horizontal frame members 28 and 29 together as shown in Fig. 4. The lower ends of the vertical frame members 30 and 31 may likewise be connected by a strut member 36 to provide a rigid framework.

Figure 5:
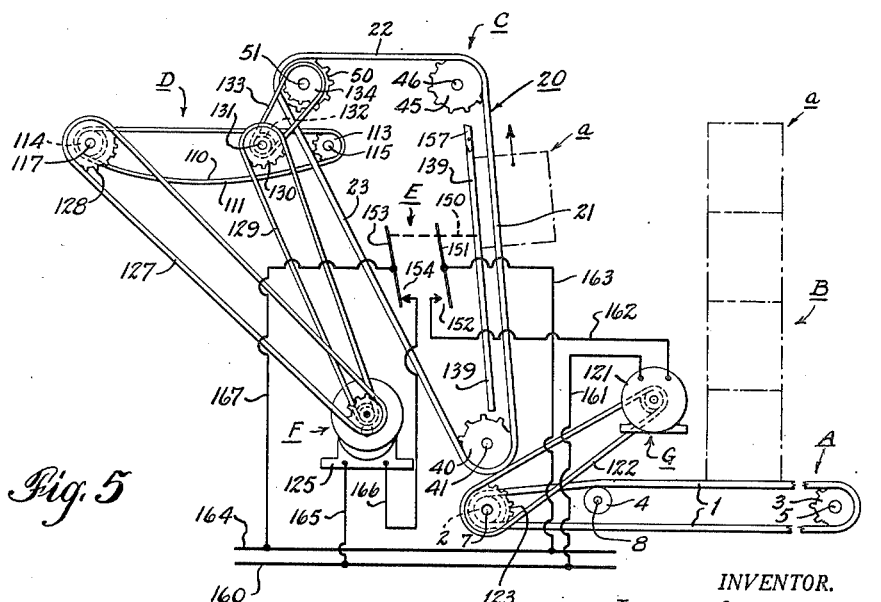
Fig. 5 is a diagrammatic view of the driving means for the moving mechanisms of the apparatus, such as the driving motors, driving belts, electrical switches and the wiring diagram therefor.

The lower end of each continuous box hoisting chain 20 is trained around a lower sprocket 40 as shown in Figs. 1, 2, 4 and 5. The lower sprocket 40 is fixed to the end of a stub shaft 41 which is journalled in a pair of bearing blocks 42, the bearing blocks 42 being fixed to a strut plate 43 which spans and is secured to the lower ends of the adjacent vertically inclined frame members 26 and 27. Each sprocket 40 is positioned directly adjacent the discharge end of the floor conveyor A and defines the lower end of the vertically inclined leg 21 of the hoisting chain 20 trained thereon. The upper end of the vertically inclined leg 21 of each hoisting chain 20 is trained around an upper sprocket 45 fixed to the end of a stub shaft 46 supported by a pair of bearing blocks 47 which are fixed to a strut plate 48 which spans and is connected to the upper ends of the adjacent vertically inclined frame members 26 and 27, as shown in Figs. 1, 2 and 5.

The upper horizontal leg 22 of each hoisting chain 20 also has the front end thereof supported by the sprocket 45, and the rear end thereof is supported by a sprocket 50 which is fixed to one end of a stub shaft 51 journalled in a suitable bearing block 52 mounted between the inner top frame member 28 and a lower secondary horizontal frame member 53 positioned directly therebelow as shown more particularly in Figs. 1, 4 and 5. The rear upper sprocket 50 and the lower sprocket 40 also support the rear leg 23 of the hoisting chain 20 as indicated in Figs. 1 and 5.

It will thus be appreciated that the paired hoisting chains 20 are positioned to travel together around similar triangular paths and are trained around corresponding sprockets 40, 45, and 50 rotatably supported from similar frameworks 25 positioned adjacent but outside the path of travel of each hoisting chain 20. It will be noted that the paired hoisting chains 20 are spaced a sufficient distance apart to permit the filled collection boxes *a* to travel therebetween, with the end walls *b* of the boxes *a* adjacent the hoisting chains 20, as shown in Figs. 2 and 4.

Box engaging mechanisms 60 are associated with each of the hoisting chains 20 which are operative to engage the collection boxes *a* and lift the same in spaced relation upwardly between the inclined vertical legs 21 of the hoisting chains 20 and carry the spaced boxes forwardly between the horizontal legs 22 of the hoisting chains 20 for delivery to discharging conveyor D. The end wall *b* of each box *a* has a hand hole *c* near the upper end thereof into which the box engaging mechanism engages.

Each box engaging mechanism 60 comprises a pair of box engaging dogs 61 arranged in horizontal alignment and fixed to the hoisting chains 20 in position to releasably engage the handholes *c* in the end walls *b* of the collection boxes *a*. Paired box engaging dogs 61 are arranged in convenient spaced relationship along the continuous hoisting chains 20 so that each pair of dogs operates to releasably engage and carry a single collection box therebetween.

Each box engaging dog 61 is pivotally supported upon a dog block 62 having a face section 63 which extends over the face of the chain 20, as shown in Figs. 6, 7, and 8. The face section 63 has a pair of flange sections 64 secured thereto which may be secured to the projecting ends of a pair of adjacent pivot pins 20' forming a part of the hoisting chain 20. Each box engaging dog 61 is pivotally mounted on a stud bolt 65 fixed to the face section 63 and held in pivoted position thereon by a suitable washer 66 and cap nut 67. Thus each box engaging dog 61 is pivotally connected as by stud bolt 65 to its dog block 62 which is fixed to and travels with the hoisting chain 20.

Each box engaging dog 61 has a projecting finger element 68 of sturdy construction. A box engaging roller 69 is rotatively mounted on a suitable bearing pin 70 fixed to the end of the finger element 68. When the box engaging dog 61 is in box engaging position, the finger element 68 thereof projects horizontally in position to extend into and through the hand hole *c* in the adjacent end wall *b* of the collection box *a*, as indicated in Fig. 6. Each dog 61 is resiliently retained in box engaging position by means of a pair of tension springs 71 as shown in Fig. 6, one end of the tension springs 71 being secured to a suitable lug 72 projecting from the dog 61, the other end of the tension springs 71 being secured to a suitable lug 73 projecting from the face section 63 of the dog block 62.

The spaced box engaging dogs 61 are manipulated by a cam bar 74 which is mounted to extend along the vertically inclined leg 21 of each hoisting chain, and extends substantially the full length of the inclined leg 21. The cam bar 74 as shown in Fig. 6 to 9 inclusive is generally angular in cross section and has an attaching leg 75 and a dog manipulating leg 76 which projects towards the hoisting chain 20. The manipulating leg 76 has a series of spaced cam faces 77, 78, 79 and 80 decreasing in width from the lower end of the cam bar 74 to the upper end thereof. Each cam face 77, 78, 79, and 80 terminates in an inclined track terminus 81, 82, 83 and 84 respectively. The heel 85 of each box engaging dog 61 has a stud 86 projecting therefrom. The stud 86 supports a roller 87 designed to roll over one or more of the cam faces 77, 78, 79 and 80 and to roll off one of the track termini 81, 82, 83 and 84 positioned therebetween as the dog 61 travels upwardly with the vertical leg 21 of the hoisting chain 20.

As long as the roller stud 86 associated with any box engaging dog 61 is in contact engagement with the camming faces of the manipulating leg 76 of the cam bar 74, the associated dog 61 will present its finger element 68 in an upwardly extending direction as indicated in the dotted lines in Fig. 6, in which position the finger element 68 cannot engage any of the stacked boxes *a* as supported in tilted position between the paired hoisted chains 20 as shown in Figs. 1 and 2. Thus, as long as the roller stud 86 is in contact with the camming faces of the cam bar 74, its associated dog is maintained in the generally vertical position against the action of the tension springs 71 which normally tend to pull the dog 61 downwardly into horizontal position and into abutment against the fixed dog block lug 73. However, when the roller stud 86 in its upward travel moves out of engagement with the camming faces of the cam bar 74, the tension springs 71 will pull its associated dog 61 downwardly towards its final horizontal position to the extent permitted by the adjacent end wall *b* of the adjacent box.

Assuming this improved destacking apparatus is designed to destack a stack of four boxes or less, the cam bar 74 would be equipped with a total of four uniformly spaced cam faces 77, 78, 79 and 80 of decreasing width, and a series of four successive box engaging dogs 61 would carry roller studs 86 of correspondingly decreasing length. Thus the dog 61 having the longest roller stud 86 would travel upwardly in contact engagement with the cam faces 77, 78, 79, and 80 and during which upward travel the dog 61 would be maintained in a substantially vertical position as indicated in the dotted line in Fig. 6. However, when this dog 61 has moved up to the upper end of the cam face 80, its long stud 86 would roll off the terminus 84 of the cam bar 74 to permit its dog 61 to swing downwardly at a point adjacent the lower end of the adjacent box end wall *b* of the topmost box *a*. As the hoisting chain 20 continues its upward travel, the roller 69 associated with the dog 61 will then roll up the adjacent box end wall *b* until the hand hole *c* in the box end wall is reached, at which point the tension springs 71 will be free to swing the dog 61 into a horizontal position to project the finger element 68 thereof into the hand hole *c*, and thenceforth lift the topmost box from the four high stack of boxes.

The next succeeding box engaging dog 61 would have a roller stud 86 of slightly shorter length so that it would roll off the track terminus 83 and permit its associated dog 61 to swing downwardly against the adjacent end wall *b* of the top box then in the stack which would be the third stacked box, and thus lift the third stacked box from the stack and carry it upwardly. The third and next succeeding dog 61 would have a roller stud 86 of still shorter length which would roll off the track terminus 82 so as to permit this dog 61 to swing into position to engage the then topmost box in the stack which would be the second box. Finally, the next succeeding and fourth box engaging dog 61 would have a roller stud 86 of the shortest length which would roll off the track terminus 81 and permit this dog to swing into lifting engagement with the first or lowermost box in the stack.

It will be appreciated that a pair of cam bars 74 are positioned adjacent the inclined vertical leg 21 of each hoisting chain 20, and that the paired cam bars 74 have staggered cam faces 77, 78, 79, and 80 of equal width and length with track termini 81, 82, 83, and 84 at correspondingly similar elevations, so that the paired dogs 61 will be manipulated in unison so as to simultaneously engage both ends of the box $a$ which they are designed to pick up and elevate. It will also be appreciated that if the box stack as tilted between the hoisting chains 20 is three high only, that the paired dogs 61 carrying the longest roller studs 86 will be manipulated into box lifting position above the topmost box in the three high stack and thus travel unloaded, with the following paired dogs 61 successively lifting and carrying off the remaining boxes in the stack. Thus, this improved destacking apparatus will selectively operate on any number of stacked boxes up to the maximum number of stacked boxes for which it is designed.

When each pair of dogs 61 which have engaged a box $a$ and have carried the box upwardly until they have reached the upper end of the vertically inclined leg 21, the paired dogs 61 then carry the box horizontally to a position directly over the receiving end of the discharging conveyor D, at which point means are provided to swing the paired dogs 61 out of supporting engagement with the box so as to permit the box to travel along the discharging conveyor D. As shown in Figs. 1 and 4 a cam member 90 is positioned adjacent each of the sprockets 50, the cam member 90 having a horizontal leg 91 which is attached to the adjacent horizontal frame member 28 and a vertically extending cam leg 92 having an outwardly bent entry end 93. As the paired dogs 61 which support the box $a$ therebetween arrive at the location of the cam members 90, the roller studs 86 thereof are engaged by the outwardly bent entry ends 93 of the cam legs 92, so that as the dogs 61 progress forwardly, the cam legs 92 will swing the adjacent dogs 61 out of engagement with the box end walls against the action of the tension springs 71 and thereafter permit the box to be carried forwardly on the discharging conveyor D.

It will be noted that the cam leg 92 of each cam member 90 merges into a curved cam leg section 94 as shown in Fig. 1 which in turn merges into rear cam leg section 95. The rear cam leg section 95 merges into an arcuate shaped cam leg section 96 adjacent the lower chain sprocket 40, the terminus of the arcuate cam leg section 96 merging into the lower end of the cam leg 76 of the cam bar 74. Thus it will be appreciated that each pair of box engaging dogs 61 are retained in retracted position during their travel along the adjacent cam legs 92, 94, 65 and 96 so that each pair of dogs 61 are in retracted position as they arrive at the lower end of the cam bar 74. The cam legs 94, 95, and 96 are suitably secured in rigid position to the framework of the apparatus in a manner so as not to interfere with the continuous travel of the hoisting chains 20.

It will be appreciated that when the paired dogs 61 are released from engagement with the paired cam bars 74 so as to permit the paired dogs 61 to be swung into engagement with the adjacent box end walls $b$, that the dogs 61 would tend to spread the vertically inclined legs 21 of the hoisting chains 20 apart unless the chains 20 were held in a manner to prevent such spreading. This difficulty is overcome by confining the vertically inclined leg 21 of each hoisting chain 20 between a pair of spaced metal guide strips 100 and 101, as shown more particularly in Figs. 1, 2, 6, 7, and 8. Each pair of chain guiding strips 100 and 101 are supported by spaced bolts 102.

Each bolt 102 is secured to the midsection of a cross strip 103. One end of each cross strip 103 is provided with a foot portion 104 by means of which it can be rigidly secured to the adjacent vertically inclined frame member 26 as indicated in Figs. 1, 2, and 3. The other end of the cross strip 103 is also provided with a foot portion 105 which is attached to the securing leg 75 of the adjacent cam bar 74. Thus the spaced cross strips 103 at the side of each hoisting chain 20 provides support for both the adjacent cam bar 74 and the adjacent chain guide strips 100 and 101. Each spaced bolt 102 may carry spacing collars 106 and 107 thereon which serve to fix the paired chain guide strips 100 and 101 in proper chain guiding position as shown in Fig. 8. It will thus be appreciated that the paired chain guide strips 100 and 101 associated with the inclined vertical leg 21 of each hoisting chain, serve to retain the vertical travelling legs of the chains in straight-line parallelism when the dogs 61 are swung into box engaging position.

The discharging conveyor D, as shown in Figs. 1, 2 and 4, generally comprises a continuous box supporting belt 110 which is preferably constructed from a pair of continuous conveyor chains 111 which are connected in fixed spaced relation by a series of relatively closely spaced roller bars 112 providing a travelling roller conveyor. The travelling roller conveyor 110 has a width to receive and support the boxes $a$ when arranged transversely thereof.

The paired chains 111 of the roller conveyor belt 110 are trained around a pair of sprockets 113 at the receiving end of the belt 110 and around a pair of sprockets 114 at the discharge end of the belt. The sprockets 113 are fixed to a shaft 115 rotatably mounted in bearing blocks 116, and the sprockets 114 are fixed to a shaft 117 rotatably mounted in bearing blocks 118. The bearing blocks 118 are supported by a pair of spaced frame forming rail members, 119 one end of which is secured to the adjacent vertically inclined frame members 26 and the other end thereof may be supported by a pair of inclined braces 120 fixed to the vertical frame members 30. The conveyor supporting rail members 119 may be additionally secured and supported by suitable framing or bracing as required.

The floor conveyor A is driven by an electric motor 121 positioned adjacent the hoisting conveyor C. As shown in Fig. 5, the driving motor 121 is connected to a suitable driving belt 122 which is trained around the drive wheel 123 fixed to the shaft 7 of the floor conveyor A. The operation of the driving motor 121 is controlled by switching mechanism E which will be presently described.

The hoisting conveyor C and the discharging conveyor D are both driven from a second motor 125 which may be mounted on a pair of cross frame members 126 attached to the lower horizontal framing members 32 and 33 as shown in Figs. 3 and 5. The discharging conveyor D may be driven from the motor 125 by a drive belt 127 connected to the motor 125 and trained around a drive wheel 128 fixed at one end of the conveyor belt supporting shaft 117. A second belt 129 having a driving connection with the motor 125, as shown in Figs. 1, 4 and 5, is trained around a driving wheel 130 fixed to one end of a transmission shaft 131 journalled to rotate in suitable bearings which may be connected to the horizontal rail members 119 which support the conveyor belt 110. A sprocket wheel 132 is attached to each end of the transmission shaft 131 and carries a sprocket chain 133 which is trained around a sprocket 134 fixed to one end of the stud shaft 51 which supports the hoisting chain sprocket 50. Thus the discharging conveyor belt 110 as well as the hoisting chains 20 are driven from the same motor 125 and at approximately the same travelling speed.

The switching mechanism E is so constructed and designed as to control the operation of the floor conveyor motor 121 and the hoisting motor 125 so that the floor conveyor A is driven only when the hoisting chains 20 are stationary, and so that when the hoisting chains 20 are driven, the floor conveyor A is held stationary.

The motor control mechanism E comprises a vertically extending rocking bar 135 which is pivotally supported intermediate the hoisting chains 20 by means of a lower cross bar 136 and an upper cross bar 137 which are fixed to the vertically inclined frame members 26 as shown in Figs. 1, 2, and 3. The rocker bar 135 has a pair of rocker arms 138 secured thereto. The free ends of the rocker arms 138 are in turn secured to a vertically extending box contacting bar 139 in position to be contacted by the box stack as tilted in position between the vertical legs 21 of the hoisting chains 20. The contact bar 139 may thus be swung to and from the stacked boxes $a$ positioned between the vertical legs 21 of the hoisting chains 20 by a right or left hand turn of the rocking bar 135.

The rocking bar 135 is manipulated by a lever 140, as shown in Figs. 1, 2, and 3, which is fixed to the rocking bar 135 at one end thereof and carries a pin 141 projecting from the other end thereof. One end of a weighted cable 142 is attached to the pin 141, the cable 142 being trained over a cable pulley 143 and has a suspended weight 144 attached to the other end thereof. The cable pulley 143 is mounted for rotation on a suitable bracket 145 attached to an intermediate cross bar 146 whose ends are fixed to the vertical inclined frame members 26. The weight 144 normally serves to swing the rocker arms 138 toward the stacked boxes, the outward swinging movement of the rocker arms 138 being limited by a stop pin 147 fixed to the lower cross frame 136 against which a projecting lug 148 associated with the lower rocker arm 138 is designed to abut.

A horizontal switch bar 150 is mounted adjacent the bell crank lever 140 and has one end thereof hingedly connected to a switch arm 151 controlling a switch 152 which is wired to the motor 121 which drives the floor conveyor A. The other end of the switch bar 150 is pivotally connected to the switch arm 153 of the switch 154 which is wired to the motor 125 which drives the hoisting conveyor C and the discharging conveyor D. The switch bar 150 is resiliently connected to the bell crank lever 140 by a pair of tension springs 155 and 156 as indicated in Figs. 2 and 3.

The upper end of the box contact bar 139 is provided with an extension 157 hingedly connected to the upper end thereof by a hinge pin 158 and resiliently retained in alignment therewith by a tension spring 159, one end of which is connected to the box contact bar 139 by a pin 139' and the other end of which is connected to the extension 157 by a pin 157', as shown in Figs. 1 and 2. Thus the box being lifted is in pressing contact with the box contact bar 139 and its extension 157 until the box has been placed on the receiving end of the discharging conveyor D.

Referring to the wiring diagram as illustrated in Fig. 5, power wire 160 has a lead wire 161 connected to one terminal of the motor 121 which drives the floor conveyor A, the other terminal of the motor having a lead wire 162 which leads to the switch 152 which in turn is connected by lead wire 163 to the other power wire 164. Closing and opening movement of the switch 152 as controlled by its switch arm 151 oscillated by the switch bar 150, controls the power supply to the floor conveyor motor 121.

Power line 160 is also connected by a branch wire 165 to one terminal of the motor 125 which drives the hoisting conveyor C and the discharging conveyor D. The other terminal of motor 125 is connected by lead wire 166 to switch 154 which in turn is connected by lead wire 167 to the power wire 164. The switch 154 controls the power supply to the motor 125, the switch 154 being opened and closed by the oscillating movements of the switch bar 150.

This improved box destacking apparatus operates as follows. A series of stacked boxes B as unloaded from the collection trucks are placed on the floor conveyor A. Assuming there are no boxes being unstacked by the hoisting apparatus C, the switch 152 will be closed so that the motor 121 will be driven to advance the upper run of the box chains 1 of the floor conveyor A to deliver the stacked boxes B in position between the vertically inclined legs 21 of the hoisting chains 20.

It will be noted by referring to Fig. 3, that a guard housing 170 extends vertically outside of each vertical inclined leg 21 of the hoisting chain 20, the guard housing 170 having a suitable flange 171 which may be secured to the adjacent vertically inclined frame members 26 and 27. Each guard housing also has an inwardly extending flange portion 172 and a rebent flange portion 173 which is inwardly inclined towards the vertical leg 21 of the hoisting chain and towards the adjacent end wall b of the stacked boxes. The inclined flanges or baffles 173 serve to accurately align the stacked boxes as they are advanced into position between the vertical legs 21 of the hoisting chains 20, and to further insure that the stacked boxes are accurately centered to permit the paired box lifting dogs 61 to engage the adjacent end walls of the stacked boxes.

When the upper run of the box chains 1 have advanced the stacked boxes into inclined position between the vertical inclined legs 21 of the hoisting chains 20 as shown in Figs. 1 and 3, the rear side walls of the boxes will be moved against the box contact bar 139 so as to swing the rocker arms 138 and rotate the rocker bar 135 through a sufficient angular distance to shift the switch bar 150 in a direction which will open the switch 152 which controls the operation of the floor conveyor motor 121 and thereby halt the floor conveyor A. Simultaneously, this shifting movement of the switch bar 150 will close the switch 154, place the motor 125 in operation to drive the hoisting apparatus C and the discharging conveyor D. The inclined stack of boxes in destacking position will then be separately destacked and placed upon the discharging conveyor D in the manner heretofore described.

When all the stack of boxes at the destacking position have been removed to the discharging conveyor D, the box contact bar 139 will be free to move forwardly towards the floor conveyor A, permitting the counterweight 144 to shift the switch bar 150 in the opposite direction so as to open switch 154 and halt the motor 125 which drives the hoisting apparatus C and the discharging conveyor D, and simultaneously close the switch 152 and thereby throw the motor 121 into operation to again drive the floor conveyor A. Thus it will be appreciated that the switch mechanism E automatically operates to insure alternate operation of the floor conveyor A and the hoisting apparatus C.

A switch mechanism E of somewhat more simplified form as illustrated in Fig. 10 may be used to control the operation of the floor conveyor motor 121 and the box hoisting motor 125. As shown in Fig. 10, the box contact bar 139 is vertically supported by two or more hinge arms 180, one end of each hinge arm 180 being fixed to the box contact bar 139 and the other end pivotally supported from cross framing bar having a hinge pin 181 extending therefrom, only one crossbar 146 being shown in Fig. 10. In this construction the switch bar 182 extends rearwardly and has the forward end thereof connected by a hinge pin 183 to the box contact bar 139. The switch arm 151 of the switch 152 which controls the operation of the floor conveyor motor 121, and the switch arm 153 of switch 154 which controls the operation of the hoisting motor 125, are pivotally connected to the switch bar 152. The switches 152 and 154 may be conveniently supported by a mounting plate 184 which may be secured as by means of suitable brackets 185 to the adjacent cross frame member 146.

The pressure exerted by the inclined stack of boxes in destacking position exerts pressure against the box contact bar 139 so as to shift the switch bar 182 and thus open the switch 152 to halt the floor conveyor A and simultaneously close the switch 154 to drive the hoisting apparatus C. When all of the inclined stacked boxes have been removed from destacking position and placed on the discharging conveyor D, box pressure against the box contact bar 139 is released and the counterweight 144 operates to shift the switch bar 182 to open switch 154 and close switch 152. The cable 186 connected to the counterweight 144 may be trained over conveniently arranged guide pulleys 187 and 188 and secured to the switch bar 182 as by a pin 189 projecting therefrom. Thus the alternate form of switch mechanism illustrated in Fig. 10 may also be conveniently used to effectively control the operation of the driving motors 121 and 125.

This improved destacking apparatus permits rapid unloading of the collection boxes a from the collection trucks and transportation of the collection boxes separately and in single file into the processing plant where the contents are to be processed. A relatively short floor conveyor A may be used and yet permit several collection trucks to be unloaded simultaneously with the collection boxes a vertically stacked on the floor conveyor. The hoisting apparatus C is so constructed as to insure that each stack of boxes is moved into destacking position in accurate vertical alignment with the stacked boxes individually and successively lifted by the hoisting apparatus C and singly placed on the discharging conveyor D in accurately aligned single file for transportation into the processing plant.

This improved destacking apparatus is automatic in operation and requires no manual attention during operation. The switch mechanism E automatically operates to control the operation of the floor conveyor A and the hoisting apparatus C as separately driven units in a manner so that one will not interfere with the timed operation of the other. This improved destacking apparatus greatly facilitates the unloading and transportation of the collection boxes into the processing plant, eliminates the unloading bottlenecks which have heretofore been a serious problem during the rush picking season when large quantities of fruit and vegetables are moved to the processing plant in a short period of time. Additionally, the heavy manual labor heretofore involved in lifting and moving the collection boxes into the processing plant is substantially eliminated, insuring speedy processing of the picked fruit and vegetables when in prime condition with a minimum of labor and at the lowest possible cost.

While certain novel features of this invention have been disclosed and are pointed out in the annexed claims, it will be understood that various omissions, substitutions and changes may be made by those skilled in the art without departing from the spirit of this invention.

What is claimed is:

1. Box handling apparatus including in combination, a receiving conveyor operative to transport a series of vertically stacked boxes to residence position at a destacking station, a power unit for driving said receiving conveyor, a discharge conveyor operative to transport individual boxes in single spaced relationship from said destacking station, and destacking mechanism at said destacking station operative to successively remove individual boxes from the box stack in residence at said destacking station and to transport the successive individual boxes in single spaced relationship onto said discharge conveyor, said destacking mechanism including a pair of continuous hoisting chains each having an inclined vertical leg at the destacking station and a horizontal leg extending over the receiving end of said discharge conveyor, a power unit for driving said hoisting chains, a series of paired box lifting dogs connected to said paired chains and arranged in spaced relationship, resilient means associated with each pair of dogs for normally impelling said dogs into box engaging position, stationary cam means positioned along the vertical and horizontal legs of said hoisting chains for maintaining the paired box engaging dogs out of box engaging position, said cam means having a series of paired tracking sections terminating at predetermined elevations along the vertical legs of said hoisting chains permitting each successive pair of box lifting dogs to selectively engage the topmost box in the box stack at said destacking station and transport the successive individual boxes to said discharge conveyor during translatory movement of said hoisting chains, and a vertically inclined box contacting bar at said destacking station and means associated with said box contacting bar sensitive to the presence or non-presence of one or more boxes in residence at the destacking station for automatically controlling the operation of said power unit to activate the receiving conveyor alternately with the activation of said destacking station and discharge conveyor.

2. Box handling apparatus including in combination, a receiving conveyor operative to transport a series of vertically stacked boxes to residence position at a destacking station, a power unit for driving said receiving conveyor, a discharge conveyor operative to transport individual boxes in single spaced relationship from said destacking station, and destacking mechanism at said destacking station operative to successively remove individual boxes from the box stack in residence at said destacking station and to transport the successive individual boxes in single spaced relationship onto said discharge conveyor, said destacking mechanism including a pair of continuous hoisting chains each having a vertically inclined upwardly moving vertical leg at the destacking station, a horizontal leg extending over the receiving end of said discharge conveyor and a downwardly moving return leg, a power unit for driving said hoisting chains, a series of paired box lifting dogs connected to said paired chains and arranged in spaced relationship, resilient means associated with each pair of dogs for normally impelling said dogs into box engaging position, stationary cam track means positioned along the legs of said hoisting chains for maintaining the paired box engaging dogs out of box engaging position, said cam means having a series of paired tracking sections terminating at predetermined elevations along the upwardly moving legs of said hoisting chains permitting each successive pair of box lifting dogs to selectively engage the topmost box in the box stack at said destacking station and transport the successive individual boxes to said discharge conveyor during translatory movement of said hoisting chains, and a vertically inclined box contacting bar at said destacking station and means associated with said box contacting bar sensitive to the presence or non-presence of one or more boxes in residence at the destacking station for automatically controlling the operation of said power unit to activate the receiving conveyor alternately with the activation of said destacking station and discharge conveyor.

References Cited in the file of this patent

UNITED STATES PATENTS

| Number | Name | Date |
| --- | --- | --- |
| 1,601,971 | Knapp, Jr. | Oct. 5, 1926 |
| 1,907,458 | Stevenson | May 9, 1933 |
| 2,018,748 | Thompson | Oct. 29, 1935 |
| 2,089,385 | Llewellyn et al. | Aug. 10, 1937 |
| 2,108,457 | Tobia | Feb. 15, 1938 |
| 2,258,461 | Marsden et al. | Oct. 7, 1941 |